(12) United States Patent
Kim et al.

(10) Patent No.: US 6,807,229 B1
(45) Date of Patent: Oct. 19, 2004

(54) DECISION FEEDBACK EQUALIZER AND METHOD FOR UPDATING TAP COEFFICIENTS THEREOF

(75) Inventors: Eung-sun Kim, Yongin (KR); Kyu-min Kang, Pusan (KR); Gi-hong Im, Pohang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/417,690

(22) Filed: Oct. 13, 1999

(30) Foreign Application Priority Data

Oct. 14, 1998 (KR) ......................................... 1998-42930

(51) Int. Cl.[7] ................................................ H03H 7/30
(52) U.S. Cl. ..................................... 375/233; 708/323
(58) Field of Search ............................... 375/233, 232, 375/231, 229; 708/322, 373

(56) References Cited

U.S. PATENT DOCUMENTS

| | | | | |
|---|---|---|---|---|
| 3,798,560 A | * | 3/1974 | Taylor | 708/323 |
| 5,335,251 A | | 8/1994 | Onishi et al. | 375/100 |
| 5,517,527 A | | 5/1996 | Yu | 375/233 |
| 5,644,597 A | * | 7/1997 | Ueda | 375/232 |
| 5,712,873 A | * | 1/1998 | Shiue et al. | 375/233 |
| 5,903,615 A | * | 5/1999 | Thomson et al. | 375/346 |
| 5,949,819 A | * | 9/1999 | Bjarnason et al. | 375/222 |
| 6,002,713 A | * | 12/1999 | Goldstein et al. | 375/222 |
| 6,032,029 A | * | 2/2000 | Futagi et al. | 455/130 |
| 6,222,592 B1 | * | 4/2001 | Patel | 348/614 |
| 6,327,302 B1 | * | 12/2001 | Shen | 375/232 |

FOREIGN PATENT DOCUMENTS

| | | | |
|---|---|---|---|
| EP | 0629080 A1 | * 12/1994 | ............ H04N/5/21 |
| EP | 0 707 401 A2 | 4/1996 | |
| GB | 2336277 | 10/1999 | |
| WO | 98 09400 | 3/1998 | |

* cited by examiner

Primary Examiner—Kevin M Burd
(74) Attorney, Agent, or Firm—Lee & Sterba, P.C.

(57) ABSTRACT

A decision feedback equalizer and a method for updating tap coefficients of the decision feedback equalizer are provided. The decision feedback equalizer (DFE) includes a first equalizer for reducing channel interference noise in an input signal, a second equalizer for generating a feedback signal for reducing remaining interference noise, and an update controller for controlling the first and the second equalizers so as to freeze the second equalizer when the first equalizer is updated and to freeze the first equalizer when the second equalizer is updated. The tap coefficients of the feedforward equalizer and the feedback equalizer are alternately initialized. It then becomes possible to stably converge the levels of respective tap coefficients without diverging them and to reduce the power used for updating the tap coefficients in a steady state.

15 Claims, 2 Drawing Sheets

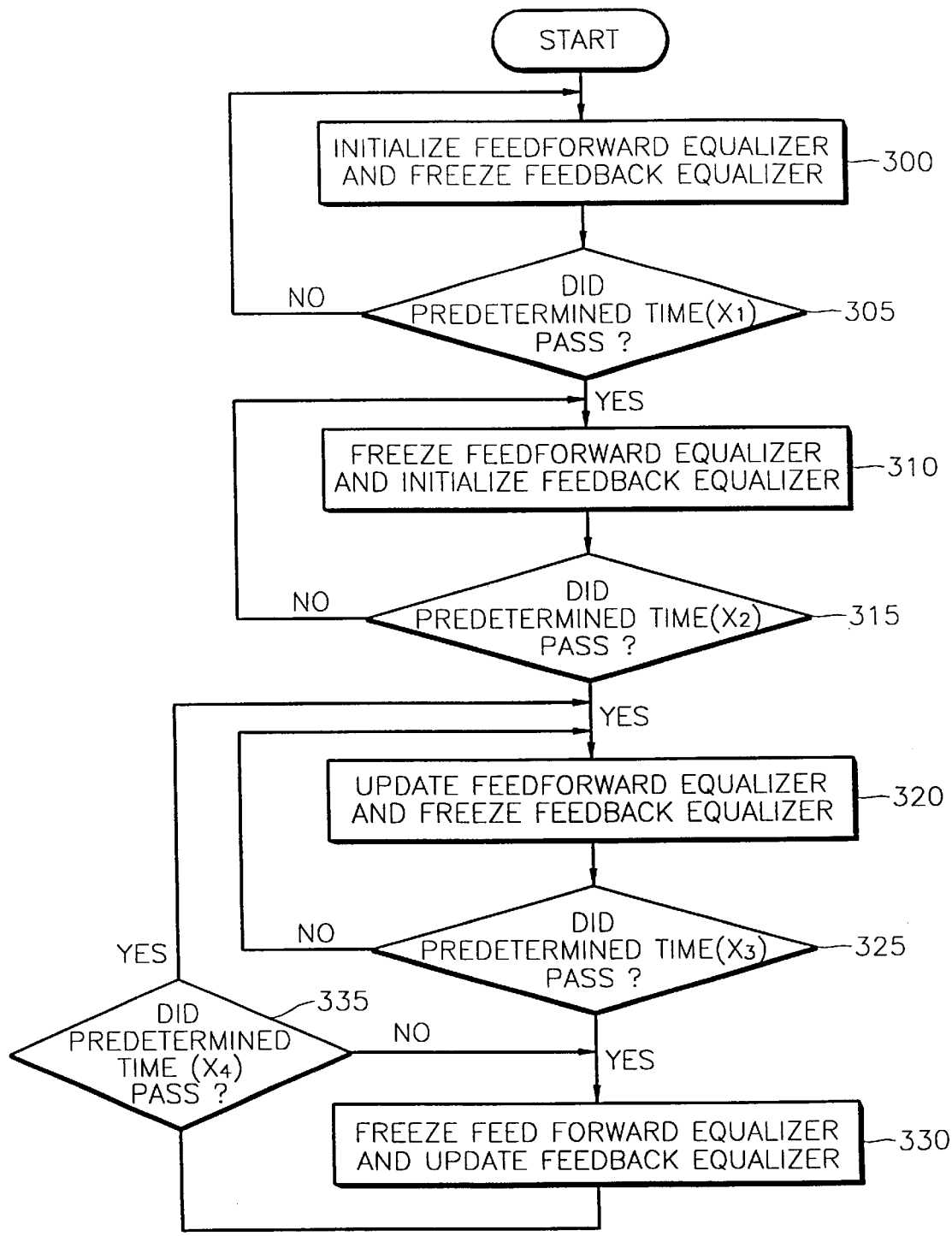

DECISION FEEDBACK EQUALIZER AND METHOD FOR UPDATING TAP COEFFICIENTS THEREOF

BACKGROUND OF THE INVENTION

1. Field of the Invention

The present invention relates to an equalizer used for a digital communication system, and more particularly, to a decision feedback equalizer (DFE) and a method for updating the tap coefficient of the DFE.

2. Description of the Related Art

A transmitted signal is applied to a receiving system through a channel in a digital communication system including a digital subscriber line receiving system. In a process in which the transmitted signal passes through the channel, the transmitted signal may become distorted. Accordingly, interference noise such as intersymbol interference (ISI) and narrowband interference are generated. Therefore, the equalizer is used in the receiving system in order to correctly detect the received signal. Namely, the equalizer is used for correctly restoring the received signal by compensating for distortion in the received signal when it passes through the channel.

When distortion is severe, the DFE reduces the ISI. In order for the DFE to correctly restore the received signal, an initializing process for adjusting the tap coefficients of the equalizer to a predetermined value and stabilizing the tap coefficients is essential. A method of initializing the DFE using a calibration signal and a method of initializing the DFE using a signal unknown to the transmitter and the receiver are used for initializing the DFE. The latter is called a blind equalization. In particular, since a training sequence known to the transmitter and the receiver cannot be used in a transmission system of a point-to-multipoint structure, the blind equalization is used.

FIG. 1 is a block diagram showing the structure of a decision feedback equalizer according to a conventional technology. Referring to FIG. 1, the DFE according to the conventional technology includes a feedforward equalizer 10, a feedback equalizer 12, and a slicer 14.

In general, in initializing the DFE according to the conventional technology, the tap coefficients of the feedforward equalizer 10 and the feedback equalizer 12 are not stabilized. Accordingly, a considerable amount of decision error can be generated in the slicer 14. An error signal due to a difference between an input signal of the slicer 14 and an output signal of the slicer 14 is used for updating the tap coefficients of the feedforward equalizer 10 and the feedback equalizer 12 in the DFE according to the conventional technology (not shown in FIG. 1). When the output of the slicer 14 is not correctly performed during the initialization of the DFE, the tap coefficients are updated in the wrong direction. As a result, the magnitude of the error signal increases, and the tap coefficients of the feedforward equalizer 10 and the feedback equalizer 12 diverge occasionally.

Also, since the feedforward equalizer 10 and the feedback equalizer 12 include a shift register, a multiplier, and an adder, they update the tap coefficients every symbol period. In such a case, the feedforward equalizer 10 and the feedback equalizer 12 perform many calculations at a high speed. Therefore, a large amount of current is consumed in order to operate the DFE according to the conventional technology.

SUMMARY OF THE INVENTION

It is a feature of the present invention to provide a decision feedback equalizer in which the tap coefficients of a feedforward equalizer and a feedback equalizer do not diverge but are stabilized during initialization and power efficiency is improved during a steady state.

It is another feature of the present invention to provide a method for updating the tap coefficients of the decision feedback equalizer.

According to a feature of the present invention there is provided a decision feedback equalizer, comprising a first equalizer for reducing interference noise of a channel in an input signal, a second equalizer for generating a feedback signal for reducing remaining interference noise, and an update controller for controlling the first and the second equalizers so as to freeze said second equalizer when the first equalizer is updated and to freeze the first equalizer when the second equalizer is updated.

According to another feature of the present invention, a feedforward equalizer includes a plurality of tap coefficients corresponding to a time order of a signal and removes a post-cursor of a channel as well as a pre-cursor of a channel by selecting a tap coefficient corresponding to a middle time between the tap coefficients as a main tap coefficient.

According to yet another feature of the present invention, an update value calculator is provided for calculating a tap coefficient update value of the first equalizer and a tab coefficient update value of the second equalizer as the difference between input and output signals of a slicer.

According to still yet another feature of the present invention, a first means is provided for reducing interference noise of a channel in an input signal, a second means is provided for generating a feedback signal for reducing remaining interference noise, and an update controller means is provided for controlling the first and the second means so as to freeze the second means when the first means is updated and to freeze the first means when the second means is updated.

Various other features and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

The above features and advantages of the present invention will become more apparent by describing in detail a preferred embodiment thereof with reference to the attached drawings in which:

FIG. 3 is a flowchart showing a method for updating the tap coefficients of the decision feedback equalizer shown in FIG. 2.

DESCRIPTION OF THE PREFERRED EMBODIMENTS

Hereinafter, the present invention will be described in detail with reference to the attached drawings.

Applicants' Korean Patent Application No. 98-42930, filed Oct. 14, 1998, is incorporated herein by reference.

Figure 1:
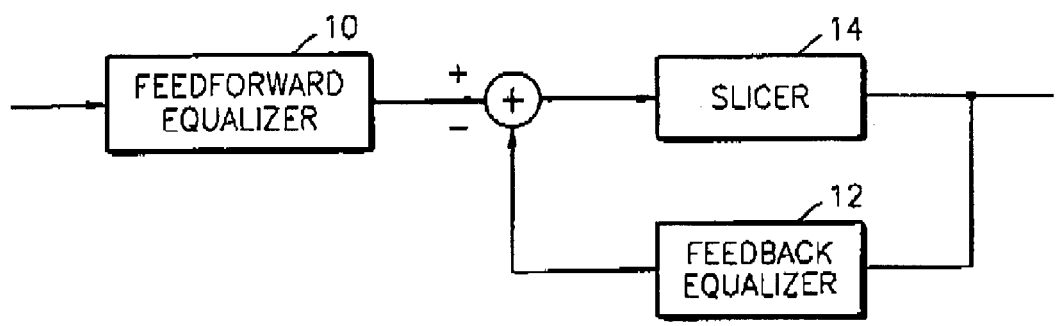
FIG. 1 is a block diagram showing the structure of a decision feedback equalizer according to a conventional technology.
Figure 2:
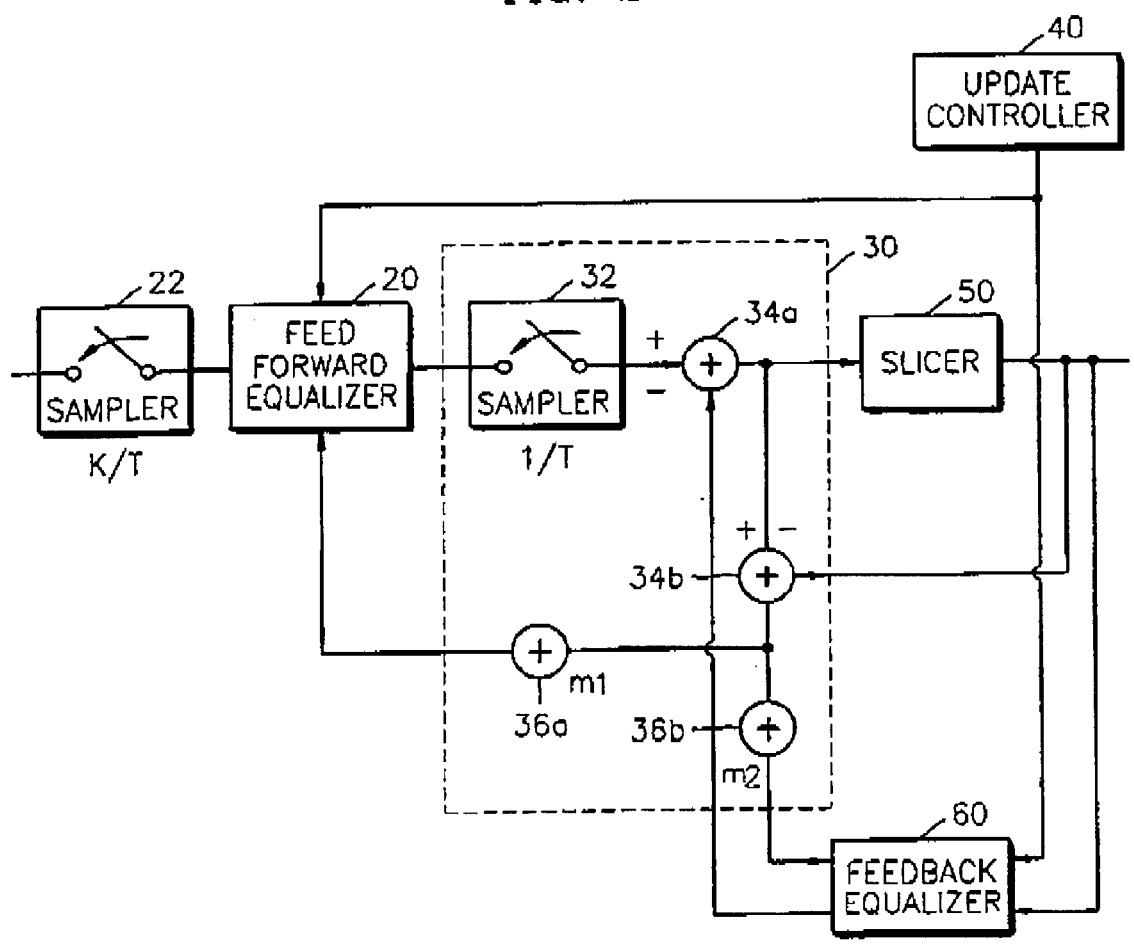
FIG. 2 is a block diagram showing the structure of an embodiment of a decision feedback equalizer according to the present invention.

Referring to FIG. 2, a decision feedback equalizer according to an embodiment of the present invention includes a first equalizer 20, a signal calculator 28, a slicer 30, a second equalizer 40, an update value calculator 50, and an update controller 60.

The first equalizer 20 for removing pre-cursor interference of an input signal from a communication channel includes a sampler 22, a feedforward equalizer 24, and a down-sampler 26.

The sampler 22 samples a signal received from the communication channel. The feedforward equalizer 24 includes a plurality of tap coefficients corresponding to the time order of a signal. The feedforward equalizer included in the decision feedback equalizer according to the conventional technology removes only the precursor interference by selecting a tap coefficient corresponding to the earliest time as a main tap coefficient among the tap coefficients.

However, the feedforward equalizer 24 included in an embodiment of the present invention partially removes a post-cursor as well as the pre-cursor interference of the input signal from the channel by selecting a tap coefficient corresponding to a middle time as a main tap coefficient among the input tap signal. The down-sampler 26 down samples the output signal of the feedforward equalizer 24 at a symbol rate.

The signal calculator 28 subtracts a feedback which is an output signal of the feedback equalizer 40 from the output signal of the down-sampler 26 and provides the subtraction result to the slicer 30. The signal 28 can be realized using an adder or a subtracter.

The slicer 30 receives the output of the signal calculator 28, detects digital data which is a logic '1' or a logic '0' value, and outputs the digital data.

A second equalizer is the feedback equalizer 40 including a plurality of tap coefficients for generating a feedback signal for removing the post-cursor interference, using the output signal of the slicer as an input signal.

The update value calculator 50 includes an error signal calculator 52 for calculating an error signal by a difference between the input signal of the slicer 30 and the output signal of the slicer 30, a first update value calculator 54 for multiplying the error signal by a predetermined first gain value $\mu_1$ and calculating the tap coefficient update value of the feedforward equalizer 24, and a second update value calculator 56 for multiplying the error signal by a predetermined second gain value $\mu_2$ and calculating the tap coefficient update value of the feedback equalizer 40. The error signal calculator 52 can be realized using an adder or a subtracter. The first update value calculator 54 and the second update value calculator 56 each can be realized using a multiplier.

The update controller 60 controls the update of the tap coefficients so as to freeze the tap coefficients of the feedback equalizer 40 for a predetermined first time period when the tap coefficients of the feedforward equalizer 24 are initialized, and to freeze the tap coefficients of the feedforward equalizer 24 for a predetermined second time period when the tap coefficients of the feedback equalizer 40 are initialized, during a blind initialization. During a steady state, the update controller 60 repeatedly controls the update of the tap coefficients so as to alternately freeze the tap coefficients of the feedback equalizer 40 for a predetermined third time period when the tap coefficients of the feedforward equalizer 24 are updated and the tap coefficients of the feedforward equalizer 24 for a predetermined fourth time period when the tap coefficients of the feedback equalizer 40 are updated.

Hereinafter, a process of updating the tap coefficients of the decision feedback equalizer will be described with reference to FIGS. 2 and 3.

When the blind initialization starts with respect to a signal received through a communication channel (not shown), the update of the tap coefficients is controlled so as to freeze the feedback equalizer 40 so as not to initialize the tap coefficients of the feedback equalizer 40 and to initialize only the tap coefficients of the feedforward equalizer 24 (step 300). The step 300 is maintained for a predetermined time $x_1$ during which the feedforward equalizer 24 is sufficiently initialized (step 305). During this time, the post-cursor interference as well as the pre-cursor interference is partially removed by selecting the middle tap coefficient as the main tap coefficient among the tap coefficients included in the feedforward equalizer 24.

When the initialization of the feedforward equalizer 24 is completed, the feedforward equalizer 24 is frozen so that the tap coefficients of the feedforward equalizer 24 are not changed and the tap coefficients of the feedback equalizer 40 are initialized (step 310). The step 310 is maintained for a predetermined time $x_2$ in which the feedback equalizer 24 is sufficiently initialized (step 315).

The distortion of the input signals is compensated for by freezing the update of the tap coefficients of the feedback equalizer 40 for a predetermined time $X_3$ and updating the tap coefficients of the feedforward equalizer 24, in the steady state (steps 320 and 325). After the lapse of the predetermined time $X_3$, the distortion of the input signal is compensated for by freezing the update of the tap coefficients of the feedforward equalizer 24 for another predetermined time $X_4$ and updating the tap coefficients of the feedback equalizer 40 (steps 330 and 335). Namely, in the steady state, the process of equalizing the input signal proceeds by alternately selecting between the feedforward equalizer 24 and the feedback equalizer 40 and updating only the tap coefficients of the selected equalizer. Since the feedforward equalizer 24 and the feedback equalizer 40 partially remove the post-cursor interference in the steady state, the system stably operates even though the tap coefficients of the equalizers 24 and 40 are alternately updated. Also, according to an embodiment of the present invention, since the tap coefficients of the feedforward equalizer 24 and the feedback equalizer 40 are alternately updated, power used for updating the tap coefficients is reduced to half that of the conventional technology in which the tap coefficients of the feedforward equalizer 24 and the feedback equalizer 40 are always updated.

According to the present invention, it is possible to converge the respective tap coefficients rather than diverge them since the tap coefficients of the feedforward equalizer and the feedback equalizer are alternately initialized.

It is to be understood that the provided illustrative examples are by no means exhaustive of the many possible uses for our invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims.

What is claimed is:

1. A decision feedback equalizer, comprising:
   a first equalizer for reducing channel interference noise of a channel in an input signal;
   a second equalizer for generating a feedback signal for reducing remaining interference noise; and an update controller for controlling an updating operation of said first and said second equalizers so as to freeze the updating operation of said second equalizer when said first equalizer is updated and to freeze the updating operation of said first equalizer when said second equalizer is updated.

2. A decision feedback equalizer as claimed in claim 1, wherein said first equalizer comprises:
   a sampler for sampling an input signal;
   a feedforward equalizer including a plurality of tap coefficients for removing intersymbol interference from a signal sampled by said sampler; and
   a down-sampler for down-sampling said output signal of said feedforward equalizer at a symbol rate.

3. A decision feedback equalizer as claimed in claim 2, wherein said feedforward equalizer plurality of tap coefficients corresponds to a time order of a signal and removes post-cursor interference of a channel as well as a pre-cursor interference of a channel by selecting a tap coefficient corresponding to a middle time among said tap coefficients as a main tap coefficient.

4. A decision feedback equalizer as claimed in claim 1, further including a signal calculator for subtracting a feedback signal from an output signal of said first equalizer.

5. A decision feedback equalizer as claimed in claim 4, further including a slicer for detecting data from an output signal of said signal calculator.

6. A decision feedback equalizer as claimed in claim 5, further including an update value calculator for calculating a tap coefficient update value of said first equalizer and a tap coefficient update value of said second equalizer as the difference between an input signal of said slicer and an output signal of said slicer.

7. A decision feedback equalizer as claimed in claim 6, wherein said update value calculator comprises:
   an error signal calculator for calculating an error signal as said difference between an input signal of said slicer and an output signal of said slicer;
   a first update value calculator for calculating said tap coefficient update value of said first equalizer by multiplying said error signal by a predetermined first gain value; and
   a second update value calculator for calculating said tap coefficient update value of said second equalizer by multiplying said error signal by a predetermined second gain value.

8. A decision feedback equalizer as claimed in claim 1, wherein said update controller controls the update of tap coefficients so as to freeze tap coefficients of said second equalizer for a predetermined first time period when tap coefficients of said first equalizer are initialized and to freeze said tap coefficients of said first equalizer for a predetermined second time period when said tap coefficients of said second equalizer are initialized, during a blind initialization, and repeatedly controls said update of said tap coefficients by alternately freezing said tap coefficients of said second equalizer for a predetermined third time period when said tap coefficients of said first equalizer are updated and freezing said tap coefficients of said first equalizer for a predetermined fourth time period when said tap coefficients of said second equalizer are updated, in a steady state.

9. A decision feedback equalizer as claimed in claim 5, wherein said second equalizer uses said output signal of said slicer as an input signal.

10. A method for updating a decision feedback equalizer comprising a first equalizer for reducing channel interference noise of an input signal, a slicer for detecting data in a signal obtained by subtracting a feedback signal from an output signal of said first equalizer, and a second equalizer which generates a feedback signal reducing the remaining interference noise using an output signal of said slicer as an input signal, said method comprising the steps of:
   conducting a blind initialization updating step, wherein said blind initialization updating step comprises the steps of:
      freezing an updating operation of said second equalizer for a predetermined first time period when said first equalizer is updated; and
      freezing an updating operation of said first equalizer for a predetermined second time period when said second equalizer is updated; and
   conducting a steady state updating step, wherein said steady state updating step comprises:
      freezing the updating operation of said second equalizer for a predetermined third time period when said first equalizer is updated; and
      freezing the updating operation of said first equalizer for a predetermined fourth time period when said second equalizer is updated.

11. A method for updating a decision feedback equalizer as claimed in claim 10, further including the step of providing a plurality of tap coefficients for said first and second equalizers.

12. A decision feedback equalizer, comprising:
   first means for reducing channel interference noise in an input signal; second means for generating a feedback signal for reducing remaining interference noise; and
   an update controller that controls an updating operation of said first and said second means so as to freeze the updating operation of said second means when said first means is updated and to freeze the updating operation of said first means when said second means is updated.

13. A decision feedback equalizer as claimed in claim 12, wherein said first and second means are equalizers.

14. A decision feedback equalizer as claimed in claim 12, wherein said first and second means include a plurality of tap coefficients.

15. A decision feedback equalizer as claimed in claim 14, wherein said update controller controls the update of said tap coefficients so as to freeze tap coefficients of said second means for a predetermined first time period when said tap coefficients of said first means are initialized and to freeze said tap coefficients of said first means for a predetermined second time period when said tap coefficients of said second means are initialized, during a blind initialization, and repeatedly controls said update of said tap coefficients by alternately freezing said tap coefficients of said second means for a predetermined third time period when said tap coefficients of said first means are updated and freezing said tap coefficients of said first means for a predetermined fourth time period when said tap coefficients of said second means are updated, in a steady state.

* * * * *